United States Patent
Hecht

[19]

[11] Patent Number: 5,900,611
[45] Date of Patent: May 4, 1999

[54] LASER SCANNER WITH INTEGRAL DISTANCE MEASUREMENT SYSTEM

[75] Inventor: Kurt Hecht, Hartsville, Pa.

[73] Assignee: Accu-Sort Systems, Inc., Telford, Pa.

[21] Appl. No.: 08/884,809

[22] Filed: Jun. 30, 1997

[51] Int. Cl.⁶ .................................................. G06K 7/10
[52] U.S. Cl. .................... 235/454; 235/462; 250/201.6
[58] Field of Search ........................ 356/375; 250/201.4, 250/201.6, 559.44, 568; 235/454, 462, 472

[56] References Cited

U.S. PATENT DOCUMENTS

| | | | |
|---|---|---|---|
| 4,816,659 | 3/1989 | Bianco et al. | 235/462 |
| 4,818,847 | 4/1989 | Hara et al. | 235/455 |
| 4,877,949 | 10/1989 | Danielson et al. | 235/462 |
| 4,920,255 | 4/1990 | Gabeler | 235/454 |
| 5,128,528 | 7/1992 | Heninger | 235/470 |
| 5,192,856 | 3/1993 | Schaham | 235/462 |
| 5,216,230 | 6/1993 | Nakazawa | 235/454 |
| 5,247,162 | 9/1993 | Swartz et al. | 235/467 |
| 5,308,960 | 5/1994 | Smith et al. | 235/454 |
| 5,340,971 | 8/1994 | Rockstein et al. | 235/472 |
| 5,426,288 | 6/1995 | Obata et al. | 235/462 |
| 5,483,051 | 1/1996 | Marchi | 235/462 |
| 5,510,603 | 4/1996 | Hess et al. | 235/454 |
| 5,534,684 | 7/1996 | Danielson | 235/462 |

OTHER PUBLICATIONS

Hamamatsu Photonics K.K. brochure entitled "Position–Sensitive Detectors", Oct. 1988.
Seikosha Co., Ltd. brochure entitled "X–126 Distance Sensor Module". undated.
Unknown Titled Article from Photonics Spectra, May 1997.

*Primary Examiner*—F. L. Evans
*Attorney, Agent, or Firm*—Volpe and Koenig, P.C.

[57] ABSTRACT

The present invention relates to a scanner for reading coded symbologies. The invention uses a coherent, visible light source for illuminating the coded symbol during a scan and a detecting means for collecting the reflected light energy from the coded symbol. The invention also employs an invisible light source illuminating the coded symbol during the scan and a one-dimensional position-sensitive detector whose field of view receives images of the illuminating beam. The position-sensitive detector outputs a current which is processed to detect the presence and compute the distance of an object being scanned. Both the visible and invisible light sources from the scanner travel along a shared, coaxial path to and from the object.

13 Claims, 5 Drawing Sheets

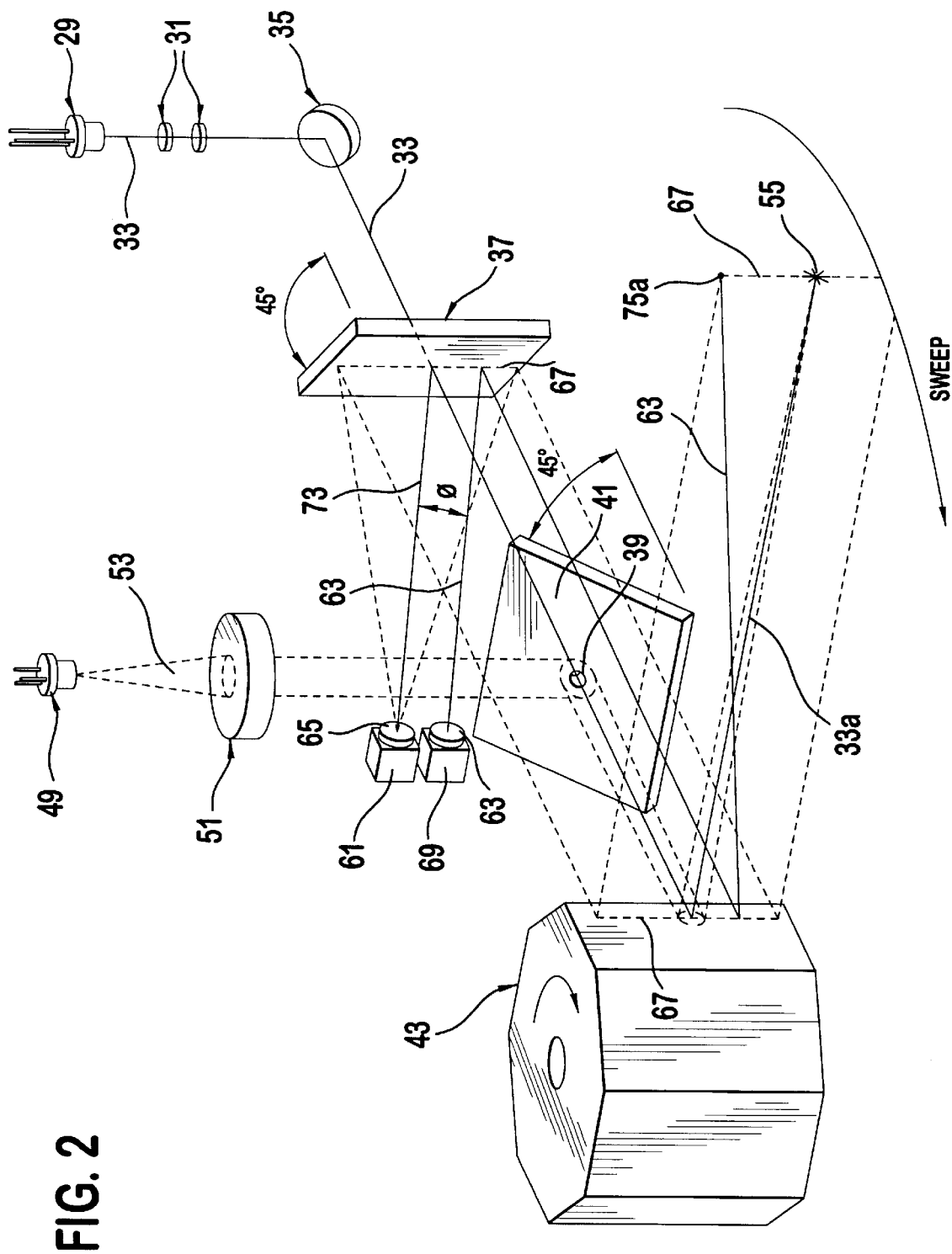

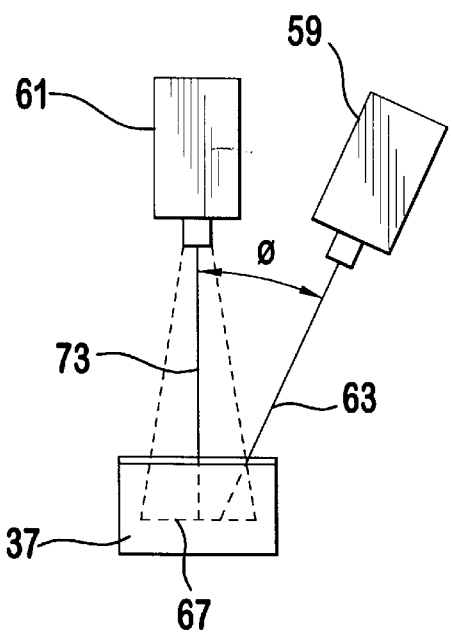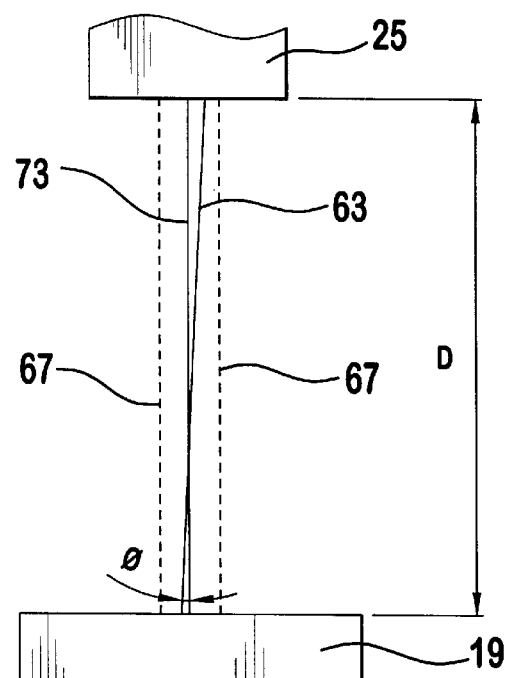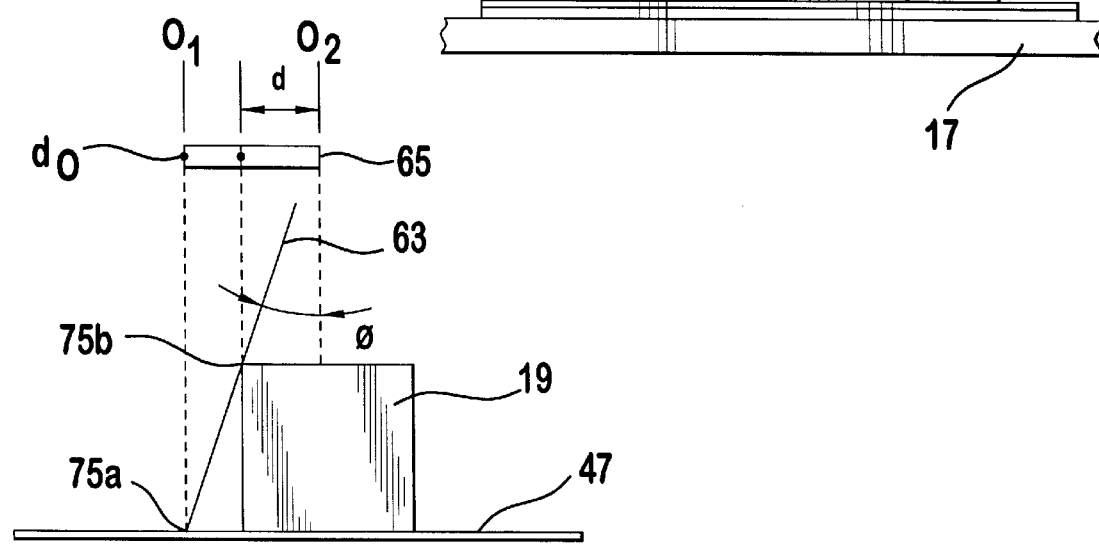

LASER SCANNER WITH INTEGRAL DISTANCE MEASUREMENT SYSTEM

BACKGROUND OF THE INVENTION

1. Field of the Invention

The present invention relates to an apparatus for reading coded symbologies on an object while determining the distance from the apparatus to the object. More particularly, it relates to a scanning device that determines the distance from the scanner to the object to allow for the focusing of the scanning beam such that high resolution, reflected light can be obtained from the object surface. Most particularly, the invention is directed to an automatic scanning system which accurately determines the distance and subsequently focuses the scanning beam onto an object for accurately reading coded symbologies.

2. Description of the Prior Art

To reduce costs and increase the volume of packages handled, the shipping industry has embraced automated package handling. This has been accomplished through package identification by coded symbologies placed on the packages and sorting performed by automated equipment using scanners that have the capability of reading the label and then routing the packages.

A scanner used in this application must be capable of reading different coded symbologies at varying distances due to different object sizes. One limiting factor in reading coded symbologies is the size of the laser spot at the label distance. Depending upon where the scanner has been prefocused, the laser spot will be larger in front of and behind the prefocused distance. The usable range where the laser spot size is acceptable is commonly referred to as the depth of field.

In an effort to increase the depth of field of a scanning system, various methods have been tried. Some methods rely upon several laser scanners prefocused for different object heights thereby having a large aggregate depth of field. Others rely upon folded light paths to increase a len's focal length or special angular solutions for the optics. Other external methods include light curtains and photoeyes to determine the height of an object which must then be input into the scanning system to electromechanically focus a lens element of the scanning beam.

In order to increase the efficiency and reduce the cost of a scanning system, it is desirable to have a low cost, lightweight compact means for providing a distance measurement internal to a scanning system to allow for the precise focusing of the scanning beam.

SUMMARY OF THE INVENTION

The present invention relates to a scanner for reading coded symbologies. The invention uses a coherent, visible light source for illuminating the coded symbol on an object during a scan and a detecting means for collecting the reflected light energy from the coded symbol. The invention also employs an invisible light source during the scan and a one-dimensional position-sensitive detector (PSD) whose field of view receives images of the illuminating beam and outputs a current which is processed to detect the presence of the object and to compute the distance. Both the visible and infrared light sources from the scanner travel along a shared, coaxial path to and from the object.

It is an object of the invention to provide a scanning system which scans a three-dimensional object and detects the variations in light reflected from the object surface while determining the distance from the scanning system to the object.

Other objects and advantages of the system will become apparent to those skilled in the art after reading the detailed description of the preferred embodiment.

BRIEF DESCRIPTION OF THE DRAWINGS

FIG. 2 is a perspective view along line 2—2 in FIG. 1 of the scanning system showing the coaxial light paths.

FIG. 3 is a section view along line 3—3 in FIG. 1 showing the light path of the distance subsystem.

FIG. 4 is a section view along line 4—4 in FIG. 1 showing the light path of the distance substation.

FIG. 5 is an explanatory diagram which indicates how the distance from the scanner is calculated.

DESCRIPTION OF THE PREFERRED EMBODIMENT

Figure 1:
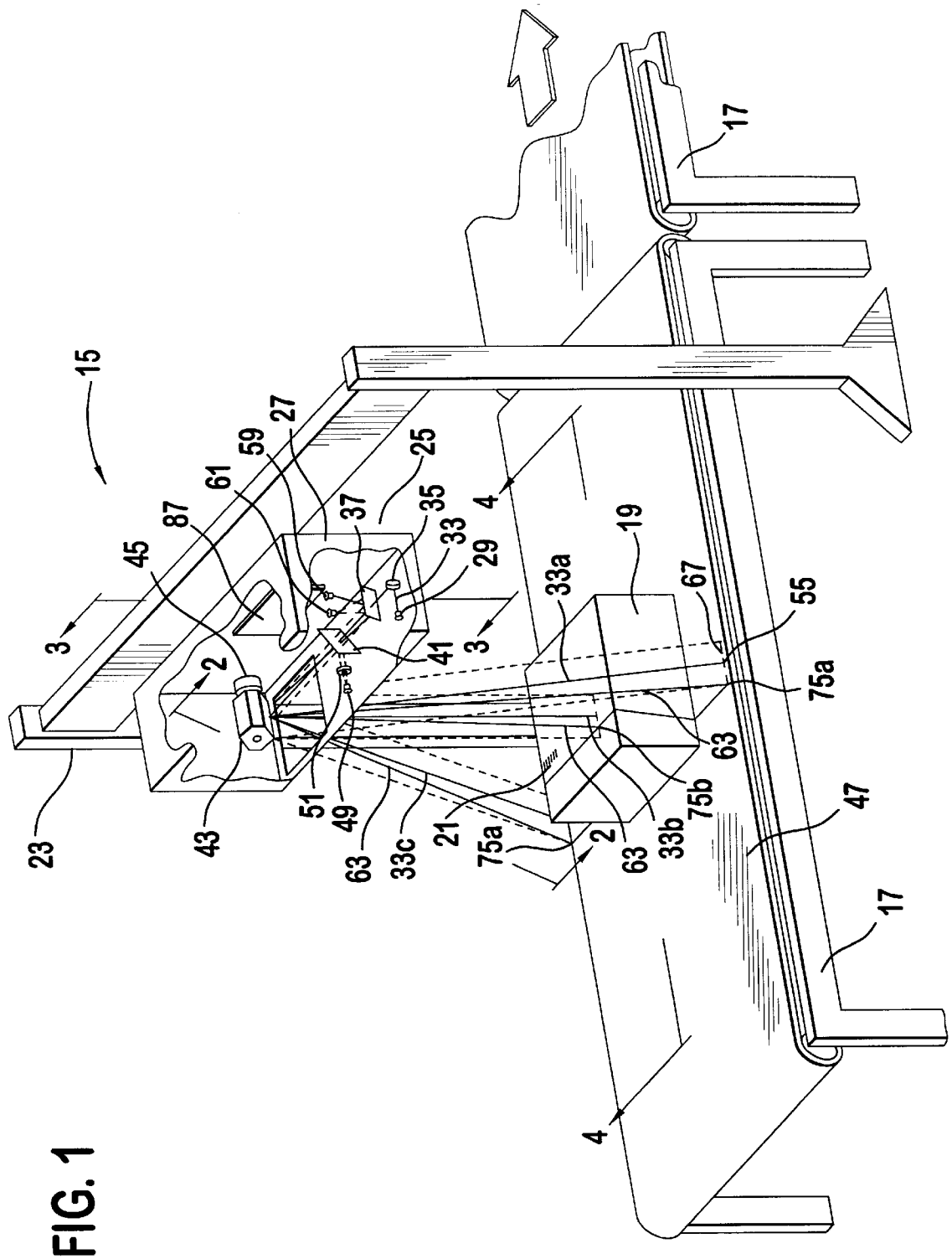
FIG. 1 is a perspective view of the scanning system in position above an object.

The preferred embodiment will be described with reference to the drawing figures where like numerals represent like elements throughout.

A scanning system 15 in accordance with the present invention is shown in FIG. 1. The scanning system 15 is positioned above a conveyor section 17 carrying an object 19. The scanning system 15 can be mounted either above the object 19 to be scanned (as shown in FIG. 1) or positioned to any side (not shown) to capture coded symbologies 21 located on the object 19. The scanning system 15 is mounted on a stand 23 above a conveyor section 17 conveying an object 19. The main unit 25 is enclosed in a housing 27 which is made by conventional means of extruded aluminum or molded plastic. Only a portion of the housing 27 is illustrated in order to show the components of the scanning system 15 contained therein.

Referencing FIGS. 1–2, the scanning system 15 is comprised of a coded symbology reader and a distance measurement subsystem. The symbology reader is comprised of a laser diode 29 and a focusing multi-element lens assembly 31 mounted in the housing 27. The laser diode 29 produces a coherent, visible, collimated beam 33 which is focused by the lens assembly 31 and directed at a fully silvered mirror 35 oriented at a 45° angle with respect to the light path 33. The light path 33 continues to a hot mirror 37 which is transparent to light energy in the visible spectrum but reflects light energy in the infrared (IR) spectrum. The light path 33 passes through the mirror 37 and through a precise aperture 39 in a cold mirror 41 which reflects light energy in the visible spectrum but passes light energy in the IR spectrum. The laser beam 33 passes through and onto a multi-faceted mirrored wheel 43. The mirrored wheel 43 is driven by a motor 45 which moves the beam 33 as it is reflected from the turning mirrored wheel 43. This produces a series of continuous beams which have been graphically represented by 33a, 33b, 33c, which exit through a window in the housing 27. The series of beams 33a, 33b, 33c produce a scan of the conveyor belt surface 47 normal to the direction of travel defining a scanning region. This method of producing a continuous scan is familiar to those skilled in this art.

A photodiode 49 or similar device is mounted in the housing 27 directed toward a condenser lens 51. The photodiode 49 has a spot field of view 53 of every scan intercept 55. The return (visible) light 53 reflects off of either the conveyor 47 or object 29 towards the mirrored wheel 43. The mirrored wheel 43 reflects the spot field of view 53 to the cold mirror 41. The cold mirror 41 reflects the return light 53 to the condenser lens 51 which focuses the return light 53 onto the detector 49. The photocurrent output of the detector 49 is proportional to the light intensity that falls upon it. The detector 49 outputs an analog voltage to a signal conditioner 57. The signal conditioner 57 shapes the output from the detector 49 into pulses accurately representing the differing widths of the reflected bar symbologies 21. This technique is well known to those skilled in the art.

The distance measurement subsystem is comprised of an IR light source 59 and an IR receiver 61. The IR light source 59 may be an IR emitting diode 63 (IRED) or similar device. The IRED 59 is directed at the hot mirror 37 which reflects the light energy towards and through the cold mirror 41. The IRED beam 63 continues to the mirrored wheel 43 where it is reflected onto the scanning region.

The IR receiver 61 is a one dimensional position-sensitive detector (PSD) 65 mounted in the housing 27 with its field of view 67 directed towards the hot mirror 37. As the mirrored wheel 43 rotates, the line field of view 67 is directed to corresponding positions (represented as 67a, 67b, 67c) with each series of IRED scanning beams 63. The line field of view 67 passes through the cold mirror 41 and reflects off of the hot mirror 37 onto the PSD 65, The PSD 65 outputs an analog photocurrent depending where on the PSD 65 the IR energy 63 falls. This is described in greater detail later in the specification. A detection circuit 69 coupled to an arithmetic processing unit (APU) 71 mounted in the housing 27 provides a digital signal output representing distance.

The present invention makes use of two independent light sources for distance triangulation and code scanning sharing a coaxial light path within the housing 27 and to and from the conveyor surface 47. Since each light source wavelength is remote from the other, constructive or destructive interference does not occur within the system 15. The mounting geometry of the optics, detectors and light sources are held in precise alignment with materials exhibiting high rigidity while having the same thermal coefficient of expansion.

The mounting geometry of the IR light source 59, IR receiver 61 and mirrored wheel is shown in detail in FIGS. 2–4. The IR light source 59 and IR receiver 61 are mounted on a plane which is parallel to the axis of the mirrored wheel 43. As shown in FIG. 3, the IR light source 59 and IR receiver 61 are offset from each other by an angle θ. θ is defined by measuring the angle between the IRED beam 63 center and the central axis 73 of the field of view of the PSD 65.

The PSD field of view 67 is aligned in the same plane as the IRED 63 and is directed at the mirrored wheel 43. The angle of the IRED beam 63 after reflecting off of the hot mirror 37, passing through the cold mirror 41 and reflecting off of the mirrored wheel 43 remains θ.

The distance to an object 19 at a given point is measured by triangulation using the angle θ. The offset angle θ between the IRED beam 63 and the central axis 73 of the PSD field of view 67 above the conveyor creates a horizontal offset d between an intercept point 75a where the IRED beam 63 intercepts the conveyor surface 47 and image point 75b where the IRED beam 63 strikes an object 19. As shown in FIG. 5, the offset d is captured by the PSD 65 linear field of view 67. When the intercept point 75a and the image point 75b are the same, i.e. when no object is present, the image is oriented to fall at one end of the PSD 65 one-dimensional array $d_0$, calibrated for maximum distance. As an object 19 comes under the IRED scan beam 63, the image point 75b travels toward the opposite or minimum distance end of the PSD 65 based on the object 19 distance at that discrete point of the scan on the conveyor belt 47. The PSD 65 outputs photocurrents that vary as the image point 75b moves from one point on the array to another. The electrical characteristics of the PSD 65 is similar to that of a potentiometer. The outputs $0_1$, $0_2$ of the PSD 65 are input into a detection circuit 69 which conditions the signals. The output of the detection circuit 69 is input into the APU 71.

The APU 71 relates the photocurrents $0_1$, $0_1$ to distance by calculating the difference between the end values and the IRED beam 63 image point $75_b$. This value is converted to a distance d that the image point 75b is from the minimum distance end. Using this distance d and the known angle θ, the distance D from the scanner to the object 19 is calculated by the APU 71 using the simple trigonometric relationship:

$$D = \frac{d}{\tan\theta}. \tag{Eqn. 1}$$

Each time d is measured, the distance D is calculated at that discrete point. Measurements of the beam image points 75b are taken as the IRED 63 scan progresses across the conveyor.

With the distance D from the scanning system 15 to the object 19 known, the distance is used as an input to a focusing means for the laser diode 29 optics 31. The distance D may also be used for adjusting configurable frequency dependent parameters in the symbology location/decoding process.

Figure 6:
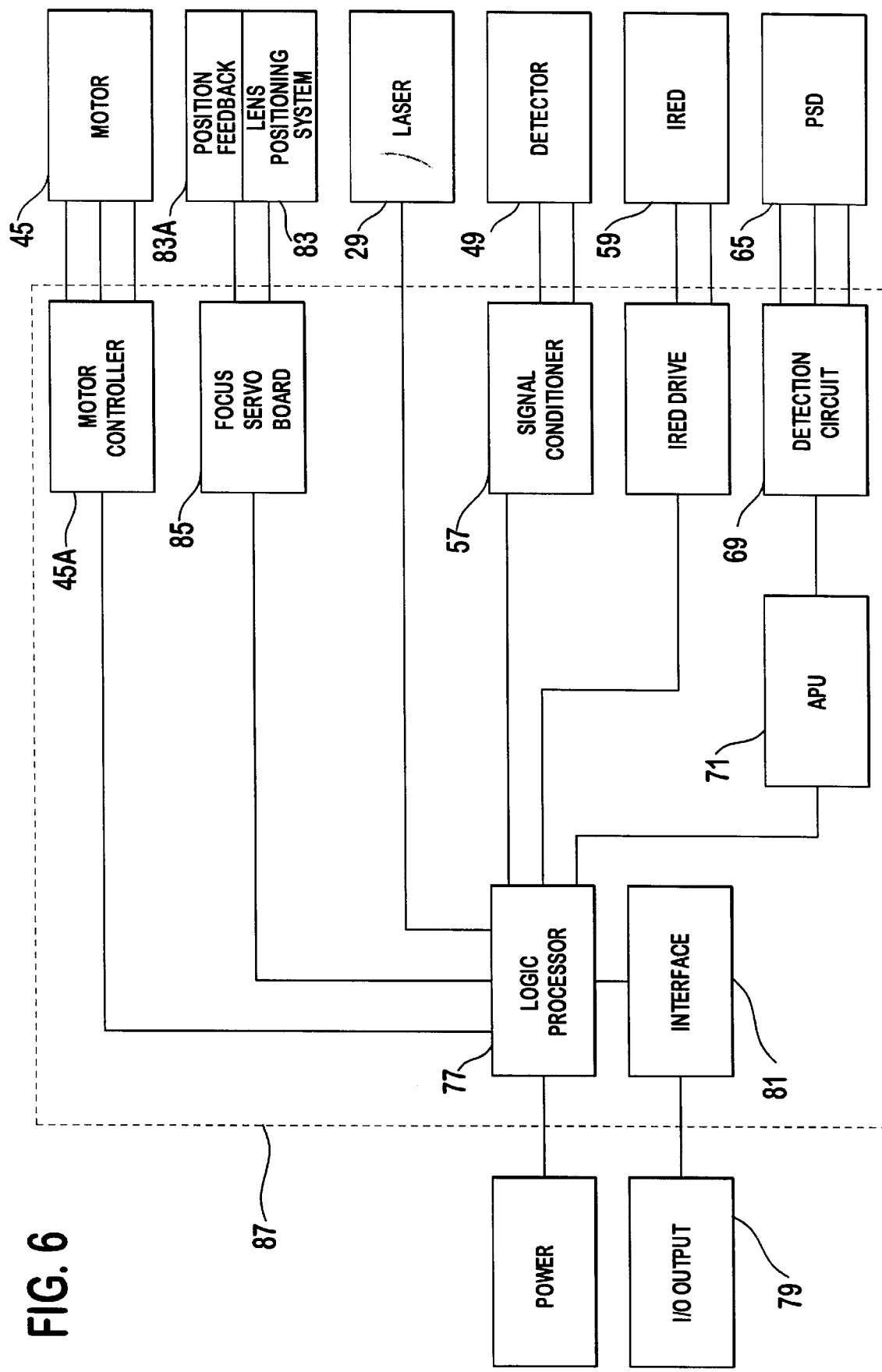
FIG. 6 is a block diagram of the control system.

A block diagram of the control system 87 for the laser scanner is shown in FIG. 6. A logic processor 77 supports the scanning system 15 by policing all activities and providing an input/output (I/O) 79 through a configurable interface 81. The logic processor 77 accepts inputs from the mirrored wheel 43 motor controller 45a, signal conditioner 57 and the distance calculation from the APU 71.

The logic processor 77 uses the distance calculation to adjust the lens 31 position of the laser 29 via a focus servoboard 85. The focus servoboard 85 energizes the lens positioning system 83 adjusting a movable lens element in accordance with the distance value. A position transducer 83a mounted on the lens positioning system 83 provides negative (position) feedback 83a to the focus servoboard 85.

Figure 7:
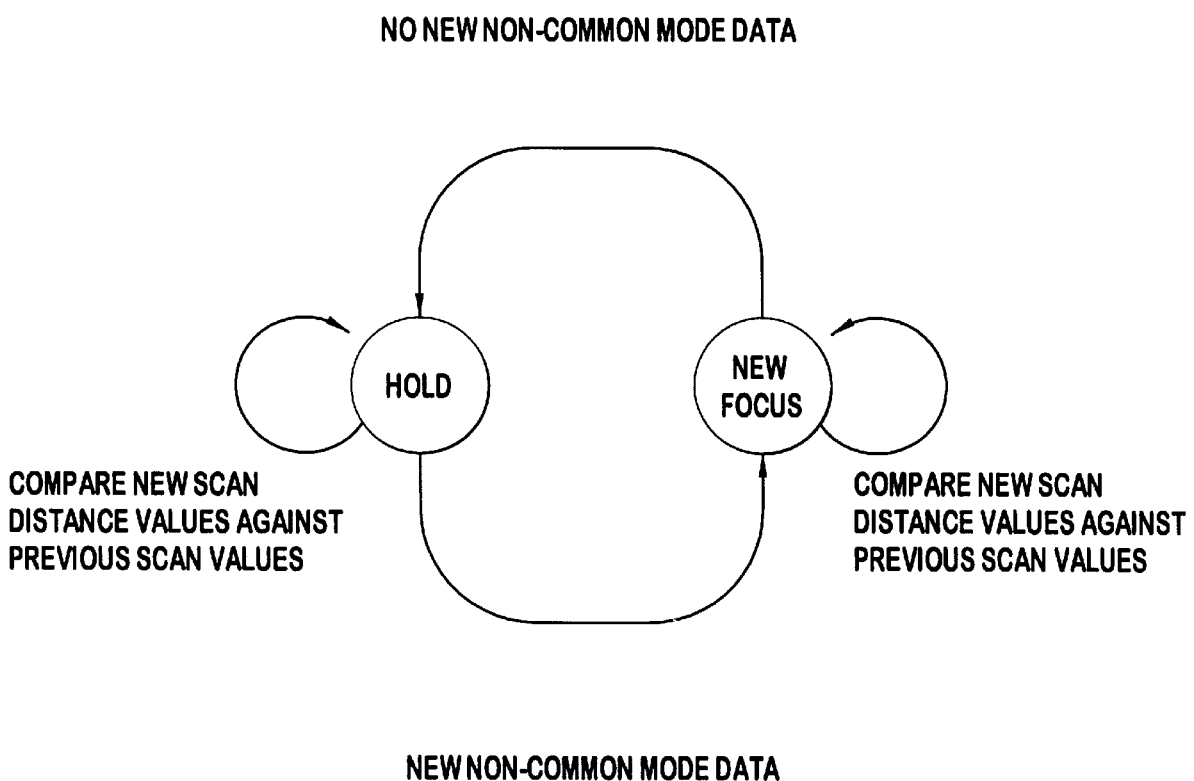
FIG. 7 is a state diagram of how object distance data is compared during consecutive scans.

Upon energizing the system 15, the lens positioning system 83 positions the focusing means at a default position. Since the system 15 acquires both symbology 21 and distance D data rapidly with each scan, for the system 15 to efficiently and accurately focus, common mode distance data between each successive scan is eliminated to conserve processing resources. A state diagram illustrating the focusing instructions for the system 15 is shown in FIG. 7. The transitions between each focusing state is determined by the logic processor 77. The lens positioning system 83 either retains its current focus position based on the distance data from the previous/subsequent scan, or refocuses in accordance with the new current distance data.

The logic processor 77 continuously processes the distance data from two consecutive scans. The logic processor 77 compares the current scan distance data against the previous scan distance data and discards common mode data between scans. If, within a reasonable threshold, both sets of distance data are equal, the logic processor 77 instructs the focus servoboard 85 to maintain the current position for the next scan. A disparity between the data of two consecutive scans indicates the presence of an object 19 or a change in target profile and results in the logic processor 77 instructing the lens positioning system 83 to refocus in accordance with the difference. The new lens position value is determined to be the longest non-common mode plateau constituting a flat surface closest to the scanner. By employing this method, the system 15 exercises the lens positioning system 83 based upon a difference in target profile rather than continuously adjusting the lens positioning system 83 during each individual scan. Therefore, rather than have the lens positioning system 83 undergo minute adjustments during each scan, the system 15 logic processor 77 eliminates unnecessary focusing instructions thereby increasing overall efficiency. The result is an efficient and accurate system 15 that reads coded symbologies 21.

The logic processor 77 is configurable using the I/O 79 for different mounting heights, maximum and minimum focusing distances and conveyor speeds using a computer executing compatible software to download the information. The logic processor 77 provides, via the I/O 79 the raw data acquired by the system 15 to external data reconstruction processors like Accu-Sort® System's DRX®. By comparing the mirror wheel 43 rotational velocity from the motor controller 45a with the distance D to the object 19 using the simple relationship $$v = \omega r, \qquad \text{(Eqn. 2)}$$

where the mirror wheel 43 speed is ω in radians per second and r (D) represents the radius of the scan, an output spot 55 velocity is computed at the object 19 by the logic processor 77. The spot 55 velocity is also output via the I/O 79 for use by the location/decoding processors to adjust frequency dependent variables such as filter parameters.

The I/O 79 also provides a means to interrogate the scanning system 15 for downloading configurable data to the logic processor 77 and focus servoboard 85 or uploading diagnostic information. The I/O 79 also outputs distance data for use with additional scanning systems that do not have an integral distance measurement system such as those in the prior art.

While specific embodiments have been shown and described, many modifications and variations could be made by one skilled in the art without departing from the spirit and scope of the invention. The above description serves to illustrate and not limit the particular form in any way.

I claim:

1. An apparatus for reading coded symbologies on an object at an indeterminate distance from the apparatus comprising:

means for generating first and second scan beams that repetitiously move across a common scanning zone of a predetermined depth such that the beams intercept any object disposed within said scanning zone;

first and second detecting means, said first detecting means having a spot field of view of said first scanning beam reflected from an object within said scanning zone, said second detecting means having a line field of view of said second scanning beam reflected from an object within said scanning zone;

said first detecting means receiving reflected images of said first scan beam continuously as said first scan beam moves across an object in said scanning zone and outputting a current proportional to said reflected images;

said second detecting means receives reflected images of said second scan beam continuously as said second scan beam moves across an object in said scanning zone and outputting a signal which varies with the placement of said detection means to the object within the depth of said scanning zone; and means for calculating the placement of the object within said predetermined scanning zone based on said reflected images of said second beam.

2. The apparatus of claim 1 wherein said first detecting means is a photodiode.

3. The apparatus of claim 2 wherein said photodiode is sensitive only to frequencies in the visible spectrum.

4. The apparatus of claim 1 wherein said second detecting means is a position-sensitive device (PSD).

5. The apparatus of claim 4 wherein said (PSD) is sensitive only to frequencies in the invisible spectrum.

6. The apparatus of claim 1 wherein said means for calculating includes an arithmetic processing unit (APU) which recieves said signal from said second detecting means and continuously calculates distance values as the object travels through said predetermined scanning zone and a logic processor which assembles said distance values into a distance profile after a scan.

7. The apparatus of claim 6 wherein said object distance values between consecutive scan distance profiles include common and non-common distance values;

said common distance values are discarded prior to determining said placement of the object; and said non-common distance values determine said placement of the object for the next scan.

8. The apparatus of claim 7 further comprising a focusing means for said first scan beam responsive to said non-common distance values.

9. An apparatus for reading coded symbologies on an object at an indeterminate distance from the apparatus traveling on a moving conveyor comprising:

a first light source which generates a visible light beam;

a second light source which generates an invisible light beam;

said visible light beam is directed through a hot mirror and through an aperture in a cold mirror onto a mirrored wheel to create a visible moving beam defining a scanning zone;

said invisible light beam is directed to said hot mirror, said hot mirror positioned at a 45 degree angle with respect to said invisible light beam;

said invisible light beam reflects off of said hot mirror and through said cold mirror onto said mirrored wheel to create an in visible moving beam in said scanning zone;

a first detector having a spot field of view sensitive to visible light;

a second detector having a line field of view sensitive to invisible light;

said first detector directed at said cold mirror at a 45 degree angle with respect to said spot field of view;

said spot field of view redirected to said mirrored wheel continuously viewing said visible moving light beam in said scanning zone;

said second detector directed at said hot mirror at a 45 degree angle with respect to said linear field of view;

said linear field of view redirected through said cold mirror onto said mirrored wheel continuously viewing said invisible moving beam in said scanning zone;

said invisible moving beam is directed at a predetermined angle relative to an object in said scanning zone;

said line field of view is directed at said invisible moving beam in an angular orientation to an object in said scanning zone which is offset from said predetermined angle with said line field of view crossing said invisible moving beam; and said second detector outputting a signal to a logic processor which computes said offset distance of an invisible moving beam intercept point and an object distance at that point in time.

10. The apparatus of claim 9 wherein said object distance is calculated using the formula $$D = \frac{d}{\tan\theta}$$

where θ is a fixed angle and d is said offset distance within said line field of view from an image point to a minimum object distance within said scanning zone.

11. The apparatus of claim 10 wherein said second detector is a position-sensitive detector (PSD) that outputs a photocurrent which represents a distance from the apparatus to an object at each image point during a scan.

12. The apparatus of claim 11 wherein object distances of a prior scan are compared with object distances of a subsequent scan determining common and non-common object distances between said prior and subsequent scans and said non-common object distances determine the object distance.

13. The apparatus of claim 12 further comprising a focusing means responsive to said non-common object distances for focusing said visible light beam.

* * * * *

UNITED STATES PATENT AND TRADEMARK OFFICE
CERTIFICATE OF CORRECTION

PATENT NO : 5,900,611
DATED : May 4, 1999
INVENTOR(S) : Kurt Hecht

It is certified that error appears in the above-identified patent and that said Letters Patent is hereby corrected as shown below:

column 2, line 14, after the word "distance", delete "substation" and insert --subsystem -- therefor.

Signed and Sealed this

Twenty-eighth Day of September, 1999

Attest:

Q. TODD DICKINSON

*Attesting Officer*     *Acting Commissioner of Patents and Trademarks*